Sept. 21, 1926.
J. BARROWMAN
BERMUDA GRASS DESTROYING ATTACHMENT
Filed Dec. 15, 1925
1,600,663
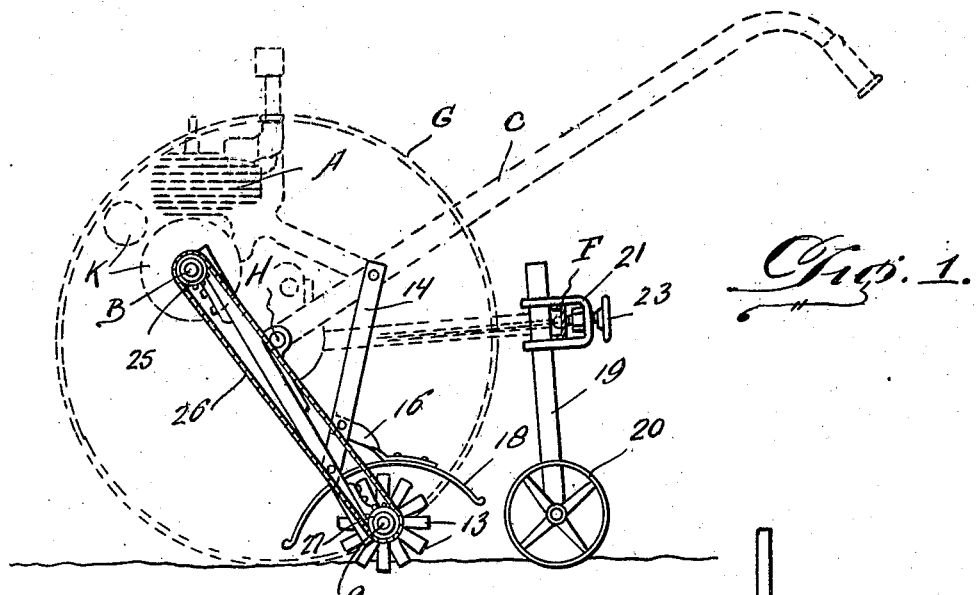
Fig. 1.
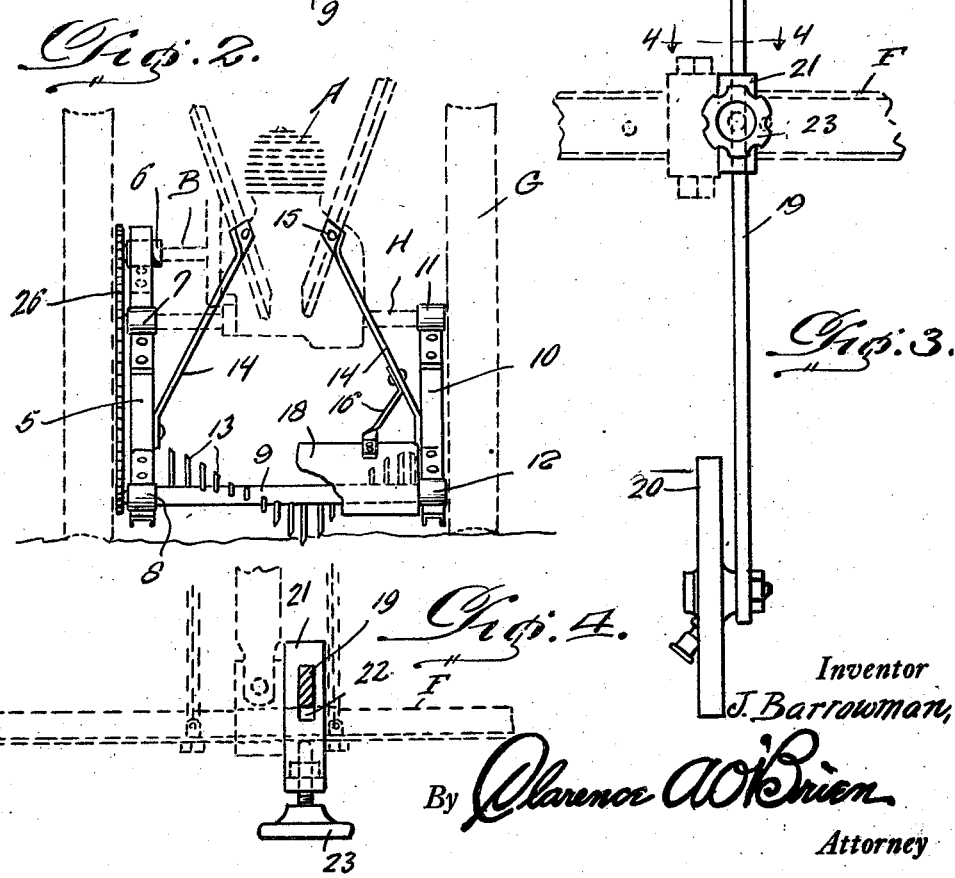
Fig. 2.
Fig. 3.
Fig. 4.
Inventor
J. Barrowman,
By Clarence A. O'Brien
Attorney Patented Sept. 21, 1926.

1,600,663

UNITED STATES PATENT OFFICE.

JAMES BARROWMAN, OF LOS ANGELES, CALIFORNIA.

BERMUDA-GRASS-DESTROYING ATTACHMENT.

Application filed December 15, 1925. Serial No. 75,549.

The present invention relates to an attachment for the lawn tractor for destroying the Bermuda-grass.

This Bermuda-grass, which is common in California and other places, is very undesirable and troublesome since it sends out long runners which take root at intervals and choke out the more desirable forms of grass.

It is a very laborious task, and therefore very expensive to eradicate this Bermuda-grass from lawns by the ordinary racking process which is seldom successful.

It is the object of the present invention to provide an attachment which may be secured to an ordinary lawn tractor for the purpose of cutting up the runners of the Bermuda-grass thereby destroying these runners and eradicating the undesirable Bermuda-grass.

Another very important object of the invention is to provide an attachment of this nature which is very simple and cheap and which will carry out the above purposes efficiently and in a reliable manner.

A further object of the invention is to provide an attachment of this nature which is strong and durable, easy to manipulate, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of the attachment embodying the features of my invention, Fig. 2 is a fragmentary rear elevation thereof, Fig. 3 is an enlarged detail elevation of a portion of the attachment, and Fig. 4 is a detail section taken substantially on the line 4—4 of Fig. 3.

Referring to the drawing in detail, it will be seen that I have shown in dotted lines a standard lawn tractor which includes among other well known elements, an engine A for driving the shaft B, handle bars C, and a rear cross bar F. The wheels G are journaled on the axle H which supports the engine A in the well known manner. The shaft B drives one of the wheels G by a suitable gear arrangement.

Referring now particularly to my attachment, it will be seen that 5 designates a standard which is inclined upwardly and forwardly and has a bearing 6 at its upper end for receiving the shaft B, a bearing 7 intermediate its ends for receiving the axle H, and a bearing 8 at its bottom end for receiving a shaft 9. The standard 5 is located in close proximity to the left hand wheel G which is the drive wheel of the tractor. Another standard 10 is located adjacent the right hand wheel G and extends in parallelism with the standard 5 and has a bearing 11 at its upper end for receiving the axle 8 and a bearing 12 at its bottom end for receiving the shaft 9.

A series of blades or cutters 13 is arranged in a spiral on the shaft 9 as is best indicated in Fig. 2. Braces 14 are attached adjacent the lower ends of the standards 5 and 10 and converge upwardly toward each other to be fixed as at 15 to their respective adjacent handle bars C. Brackets 16 are attached to intermediate portions of the braces 14 and extend inwardly and downwardly toward each other and are attached to a cylinder segmental shield 18 which is disposed over the shaft 9 and its cutter 13.

A pair of shanks 19 have journaled on their lower ends wheels 20. Each shank 19 has associated therewith a U-shaped member 21 which is provided in its leg portion with registering openings or slots 22 through which extends the shank 19. The areas of the slots 22 are greater than the cross sectional area of the shank 19 as is apparent from an inspection of Fig. 4. The U-shaped member 21 is positioned to straddle the rear cross bar F. The shank 19 is then inserted through the slots 22. A screw 23 is threaded through the intermediate portion of the member 21 for binding against the cross member C whereby the shank 19 may be brought into tight frictional engagement with the cross bar F.

It will thus be seen that the shanks 19 may be adjusted for raising and lowering the cutters 13 from the ground, depending upon how deep it is desired that these cutters should operate.

The method of operation is as follows:

Parts being in the position shown, the engine A is started in the usual well known manner for the rotation of the shaft B to drive the left hand wheel G of the lawn tractor. I place a sprocket 25 on this shaft B and frame thereover a chain 26 which is also trained over a sprocket 27 on the left hand end of the shaft 9 and this causes the rotation of the shaft 9 in the same direction with the shaft B. The rotation of the shaft 9 is opposite to the rotation of the wheels G because of the steering indicated at K in Fig. 1. As the tractor moves over the lawn, the cutters 13 will efficiently sever the runners of the Bermuda-grass into relatively small pieces, thereby destroying the life of the same.

It will readily be apparent that a rather large lawn may be gone over in a very short time with this attachment and a tractor so that the Bermuda-grass may be eradicated.

It is thought that the construction, operation, and advantages of this invention will now be clearly understood without a more detailed description thereof. The present embodiment of the attachment has been disclosed in detail since in actual practice it attains the features of advantage enumerated as desirable in the statement of the invention and the above description.

It will be apparent, however, that changes in the details of construction, and in the combination and arrangement of parts may be resorted to as do not depart from the spirit or scope of the invention as hereinafter claimed or sacrificing any of its advantages.

Having thus described my invention, what I claim as new is:—

1. An attachment of the class described for lawn tractors, wherein the lawn tractor includes among other elements an axle, wheels on the axle, and a drive shaft operatively associated with one of the wheels, comprising a standard disposed adjacent one wheel of the tractor and inclined upwardly and forwardly, a bearing at the upper end of the standard for receiving the drive shaft, a bearing on the intermediate portion of the standard for receiving the axles, and a bearing on the bottom end of the standard, a second standard, a bearing on the upper end of the second standard for receiving the axle, and a bearing on the lower end of the second standard, said second standard being disposed in parallelism with the first standard, a tool-carrying shaft journaled in the bearings on the bottom ends of the standards, means operatively connecting the tool-carrying shaft with the drive shaft.

2. An attachment of the class described for lawn tractors; wherein the lawn tractor includes among other elements an axle, wheels on the axle, a drive shaft operatively associated with one of the wheels, and a pair of rearwardly extending handle bars, comprising a standard disposed adjacent one wheel of the tractor and inclined upwardly and forwardly, a bearing at the upper end of the standard for receiving the drive shaft, a bearing on the intermediate portion of the standard for receiving the axle, and a bearing on the bottom end of the standard, a second standard, a bearing on the upper end of the second standard for receiving the axle, and a bearing on the lower end of the second standard, said second standard being disposed in parallelism with the first standard, a tool-carrying shaft journaled in the bearings on the bottom ends of the standards, means operatively connecting the tool-carrying shaft with the drive shaft, a pair of braces extending from intermediate portions of the handle bars to intermediate portions of the standards adjacent their lower ends.

3. An attachment of the class described for lawn tractors; wherein the lawn tractor includes among other elements an axle, wheels on the axle-engine, a drive shaft operatively associated with one of the wheels, and a pair of rearwardly extending handle bars, comprising a standard disposed adjacent one wheel of the tractor and inclined upwardly and forwardly, a bearing at the upper end of the standard for receiving the drive shaft, a bearing on the intermediate portion of the standard for receiving the axle, and a bearing on the bottom end of the standard, a second standard, a bearing on the upper end of the second standard for receiving the axle, and a bearing on the lower end of the second standard, said second standard being disposed in parallelism with the first mentioned standard, a tool-carrying shaft journaled in the bearings on the bottom ends of the standards, means operatively connecting the tool-carrying shaft with the drive shaft, a pair of braces extending from intermediate portions of the handle bars to intermediate portions of the standards adjacent their lower ends, brackets extending from the lower intermediate portions of the brackets inwardly thereof, and a shield attached to the lower ends of said brackets to extend over the tool-carrying shaft.

4. An attachment of the class described for lawn tractors; wherein the lawn tractor includes among other elements an axle, wheels on the axle, and a drive shaft operatively associated with one of the wheels; comprising a standard disposed adjacent one wheel of the tractor, a bearing at the upper end of the standard for receiving the drive shaft, a bearing on the intermediate portion of the standard for receiving the axle, and a bearing on the bottom end of the standard, a second standard, a bearing on the upper end of the second standard for receiving the axle, and a bearing on the lower end of the second standard, a tool carrying shaft journaled in the bearings at the bottom ends of the standards, means operatively connecting the tool carrying shaft with the drive shaft.

5. An attachment of the class described for lawn tractors; wherein the lawn tractor includes among other elements an axle, and a drive shaft operatively associated with one of the wheels; comprising a standard disposed adjacent one wheel of the tractor, a bearing at the upper end of the standard for receiving the drive shaft, a bearing on the intermediate portion of the standard for receiving the axle, and a bearing on the bottom end of the standard, a second standard adjacent the other wheel, a bearing on the upper end of the second standard for receiving the axle, and a bearing on the lower end of the second standard, a tool carrying shaft journaled in the bearings at the bottom ends of the standards, means operatively connecting the tool shaft with the drive shaft, a shield associated with the tool carrying shaft, and means for mounting said shield on said standards.

6. An attachment of the class described for lawn tractors; wherein the lawn tractor includes among other elements an axle, wheels on the axle, a drive shaft operatively associated with one of the wheels, and a rear cross bar; comprising a standard disposed adjacent one wheel of the tractor, a bearing at the upper end of the standard for receiving the drive shaft, a bearing on the intermediate portion of the standard for receiving the axle, and a bearing on the bottom end of the standard, a second standard, a bearing on the upper end of the second standard for receiving the axle, and a bearing on the lower end of the second standard, a tool carrying shaft journaled in the bearings at the bottom ends of the standards, means operatively connecting the tool carrying shaft with the drive shaft, a bracket engaged on the rear bar, a shank extending vertically through an opening provided in the bracket, a wheel journaled at the bottom end of the shank, and means for holding the shank in different adjusted positions in relation to the bracket.

In testimony whereof I affix my signature.

JAMES BARROWMAN.